(12) United States Patent
Mueller et al.

(10) Patent No.: US 7,965,075 B2
(45) Date of Patent: Jun. 21, 2011

(54) BASE MODULE FOR A MOTION SENSOR

(75) Inventors: Wolfgang-Michael Mueller, Rutesheim (DE); Jochen Groeger, Stuttgart (DE); Joerg Siedentopf, Untergruppenbach (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 11/914,848

(22) PCT Filed: Aug. 2, 2006

(86) PCT No.: PCT/EP2006/064983
§ 371 (c)(1),
(2), (4) Date: Nov. 19, 2007

(87) PCT Pub. No.: WO2007/031367
PCT Pub. Date: Mar. 22, 2007

(65) Prior Publication Data
US 2008/0198559 A1 Aug. 21, 2008

(30) Foreign Application Priority Data
Sep. 13, 2005 (DE) .......................... 10 2005 043 413

(51) Int. Cl.
*G01B 7/30* (2006.01)
(52) U.S. Cl. .................... 324/207.25; 324/173
(58) Field of Classification Search .................. 324/173, 324/207.25; 73/514.16, 514.31, 514.39; 361/728; 174/59–60, 520, 549, 551, 555–556
See application file for complete search history.

(56) References Cited

U.S. PATENT DOCUMENTS

| | | | | | |
|---|---|---|---|---|---|
| 2,332,376 | A | * | 10/1943 | Haberberger | 264/104 |
| 4,047,143 | A | * | 9/1977 | Burden et al. | 337/239 |
| 4,117,589 | A | * | 10/1978 | Francis et al. | 29/619 |
| 4,434,347 | A | * | 2/1984 | Kurtz et al. | 219/56.22 |
| 4,569,000 | A | * | 2/1986 | Noji | 361/730 |
| 4,641,418 | A | * | 2/1987 | Meddles | 264/272.17 |
| 5,409,866 | A | * | 4/1995 | Sato et al. | 29/827 |
| 5,414,355 | A | | 5/1995 | Davidson et al. | |
| 5,422,568 | A | * | 6/1995 | Hashizume et al. | 324/166 |
| 5,548,890 | A | * | 8/1996 | Tada et al. | 29/827 |
| 5,850,332 | A | * | 12/1998 | Kunieda et al. | 361/523 |
| 5,951,398 | A | | 9/1999 | Yamamoto et al. | |
| 6,222,260 | B1 | * | 4/2001 | Liang et al. | 257/691 |
| 6,822,184 | B2 | * | 11/2004 | Torti et al. | 219/118 |

(Continued)

FOREIGN PATENT DOCUMENTS

DE 40 15 311 11/1991

(Continued)

OTHER PUBLICATIONS

DE 19544660 A1, Partial English Translation, Jun. 1997.*

*Primary Examiner* — Bot L LeDynh
(74) *Attorney, Agent, or Firm* — Michael J. Striker

(57) ABSTRACT

Disclosed is a base module for a motion sensor, particularly a tacho generator, phase transducer, or transmission sensor for a motor vehicle. Said base module (22) comprises at least one busbar (11) for contacting an integrated circuit (36) used for sensing a motion. The base module (22) further comprises at least one wiring means (12, 14) which is arranged on the busbar (11). The busbar (11) and the wiring means (12) are surrounded at least in part by a sheath (26).

12 Claims, 4 Drawing Sheets

U.S. PATENT DOCUMENTS

Figure 1:
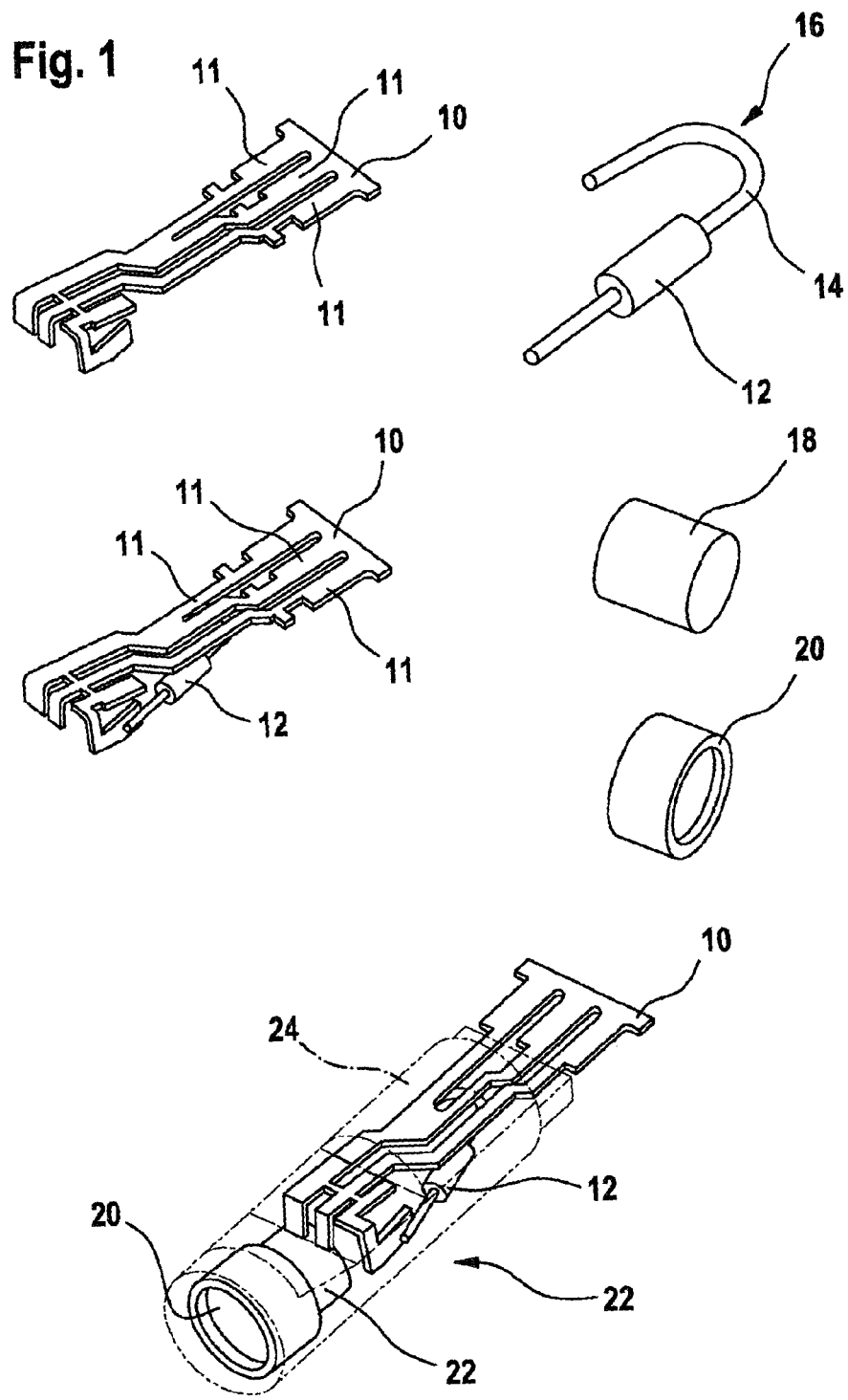

| | | | |
|---|---|---|---|
| 6,845,649 B2* | 1/2005 | Kubota et al. | 73/1.75 |
| 6,958,899 B2* | 10/2005 | Togashi et al. | 361/303 |
| 7,449,370 B2* | 11/2008 | Tanaka | 438/123 |
| 7,667,975 B2* | 2/2010 | Kambara et al. | 361/760 |
| 2001/0020546 A1* | 9/2001 | Eldridge et al. | 174/261 |
| 2002/0004251 A1* | 1/2002 | Roberts et al. | 438/26 |
| 2002/0017330 A1* | 2/2002 | Armenia et al. | 138/109 |
| 2002/0153601 A1* | 10/2002 | Chang et al. | 257/678 |
| 2002/0175801 A1* | 11/2002 | Katsuki et al. | 338/22 R |
| 2002/0180424 A1 | 12/2002 | Aoki et al. | |
| 2003/0033875 A1* | 2/2003 | Iijima et al. | 73/494 |
| 2003/0076666 A1* | 4/2003 | Daeche et al. | 361/813 |
| 2004/0124180 A1* | 7/2004 | Torti et al. | 219/61.2 |
| 2005/0077623 A1* | 4/2005 | Roberts et al. | 257/724 |
| 2006/0133044 A1* | 6/2006 | Kim et al. | 361/704 |
| 2007/0001664 A1 | 1/2007 | Steinbrink et al. | |

FOREIGN PATENT DOCUMENTS

| | | |
|---|---|---|
| DE | 42 18 793 | 12/1993 |
| DE | 195 80 281 | 5/1996 |
| DE | 195 44 660 | 6/1997 |
| DE | 101 34 646 | 2/2003 |
| DE | 10 2004 011 100 | 9/2005 |
| JP | 2000-68614 | 3/2000 |

* cited by examiner

Fig. 5
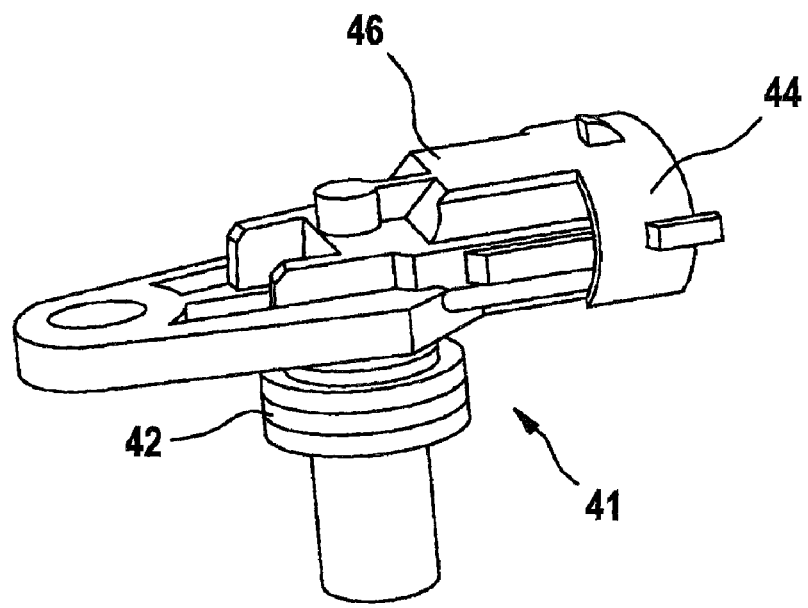
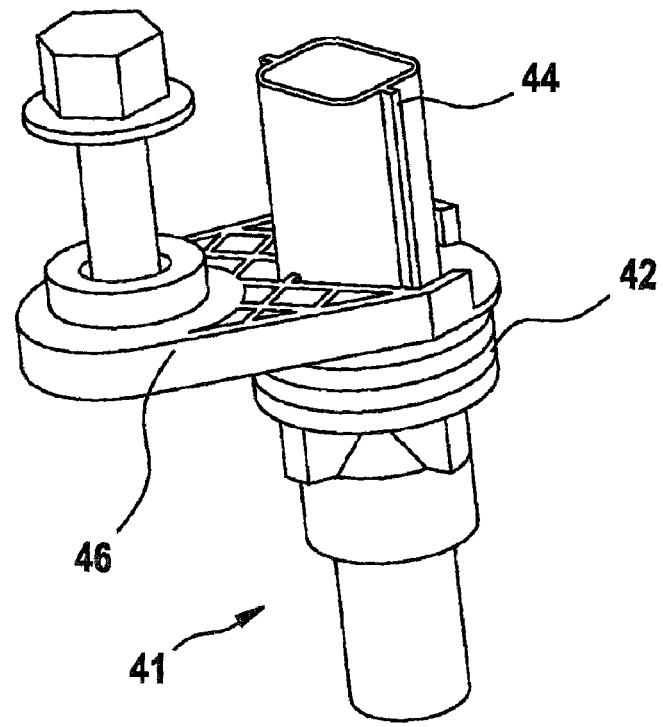

BASE MODULE FOR A MOTION SENSOR

RELATED ART

The present invention relates to a base module for a motion sensor, in particular a speed sensor or a phase sensor for a motor vehicle, which is basically known from DE 197 22 507 A. The sensor described therein includes a prefabricated housing part, in which an integrated circuit—including a magnetoresistive element and a permanent magnet—is inserted and, after they are connected with the flexible leads of a two-wire cable, they are enclosed in a plastic coating applied via injection moulding. In this manner, a system is attained that is resistant to environmental influences, but which requires a greater number of working steps to manufacture and, due to the use of a prefabricated housing, requires a relatively large amount of installation space.

Publication DE 10 2004 011 100 A makes known a motion sensor and a method for manufacturing the motion sensor. The sensor includes an integrated circuit with a primary detector—which is connectable using an electrical cable—and an electronic circuit configuration for preparing the measurement signals. The sensor includes a base module, which is manufactured via casting or injection-moulding a thermoplastic plastic, preferably polyamide, using the MID technique, and in which a permanent magnet is integrated. A housingless integrated circuit is installed on the MID component using the flip-chip technique. In a further method step, the configuration composed of the base module with the integrated circuit and the permanent magnet, and the connection end of the cable, are enclosed in an external casting and joined to produce a component that is robust and well-protected against environmental influences.

DISCLOSURE OF THE INVENTION

The object of the present invention is to provide a base module for a motion sensor that requires less fabrication outlay and installation space. This is achieved via the characterizing features of the independent claim.

It has proven advantageous that the base module includes at least one wiring means, which is located on a busbar, the busbar and wiring means being enclosed at least partially in a sheath. As part of an EMC network, these wiring means serve to suppress interference and adapt the voltage level to different voltage levels. Given that the wiring means, preferably an electrical resistor, are located directly on the punched grid of the busbar, very small dimensions of the base module may be attained. With the present invention, an additional printed circuit board need not be provided. Since the wiring means and busbars are provided with a coating applied via injection-moulding, the base module is robust against external mechanical stresses, such as vibration stresses.

In an advantageous refinement, it is provided that the wire of the resistor is composed of steel and has a bend that is preferably greater than 90°. The resistor must be bent in order for it to be provided with a coating, e.g., of Thermoplast, applied via injection-moulding, which makes the configuration robust against very great, frequent temperature changes.

In an advantageous refinement it is provided that the busbars are crossed by the wiring means. As a result, if a customer prefers a certain plug configuration, this can be accommodated with very little effort, e.g., when the connection geometries of the integrated circuit and the plug configuration differ.

In an advantageous refinement, it is provided that the integrated circuit is located on a lead strip or a lead frame, which includes two bends. As a result, the base module may be designed even smaller in size, in particular with a small diameter. This is possible because the capacitors installed on the lead strip or the lead frame require less installation space.

In a further advantageous refinement it is provided that the jacket is applied in only one working step, preferably via injection-moulding. This is a particularly cost-favorable manufacturing method, since it is possible to eliminate a working step, e.g., enclosing the top in a coating applied via injection-moulding, or filling with Duroplast, as compared with conventional manufacturing methods.

Further details and advantageous configurations of the present invention result from the dependent claims and the description of the exemplary embodiments depicted in the drawing.

Figure 2:
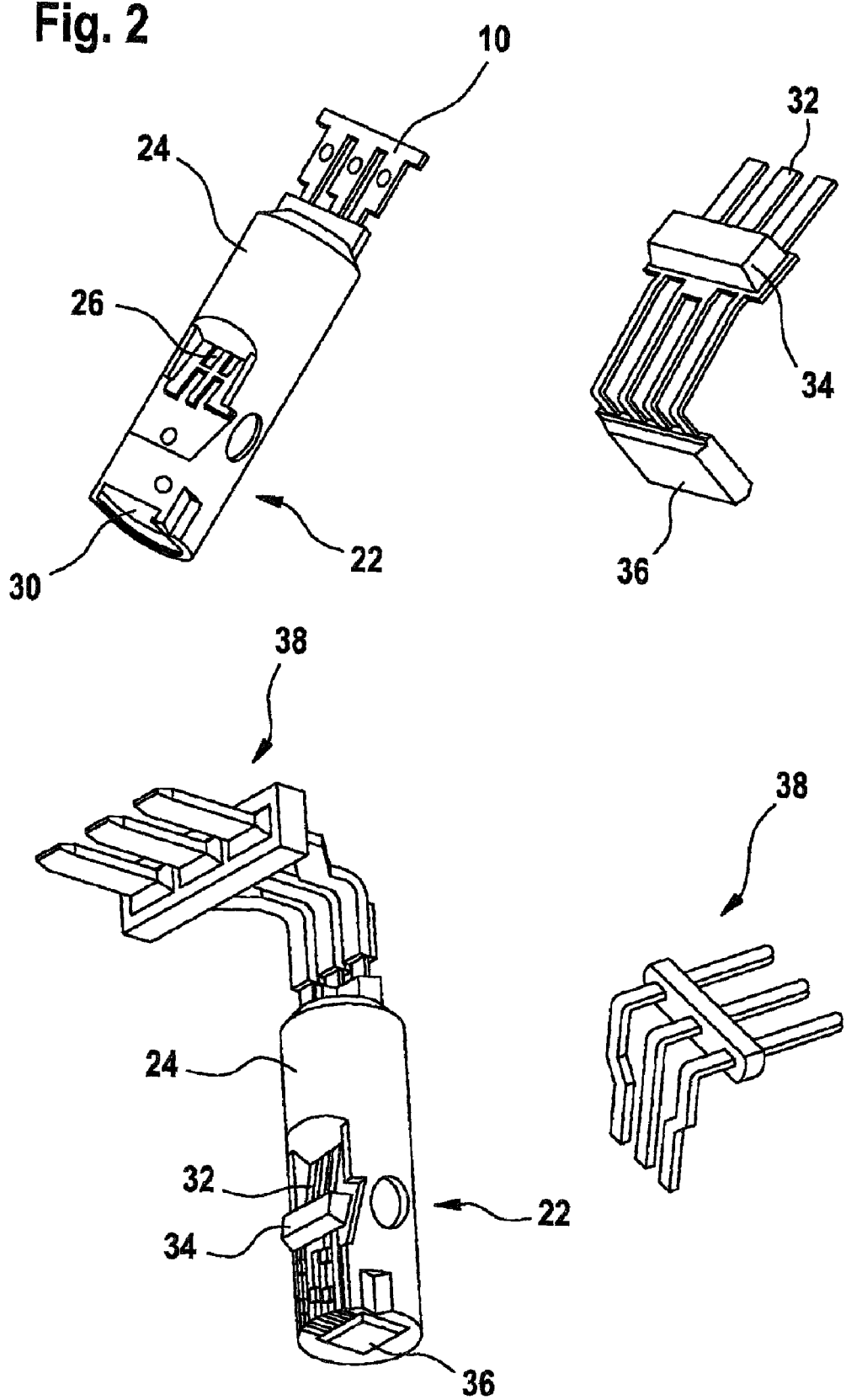
Figure 3:
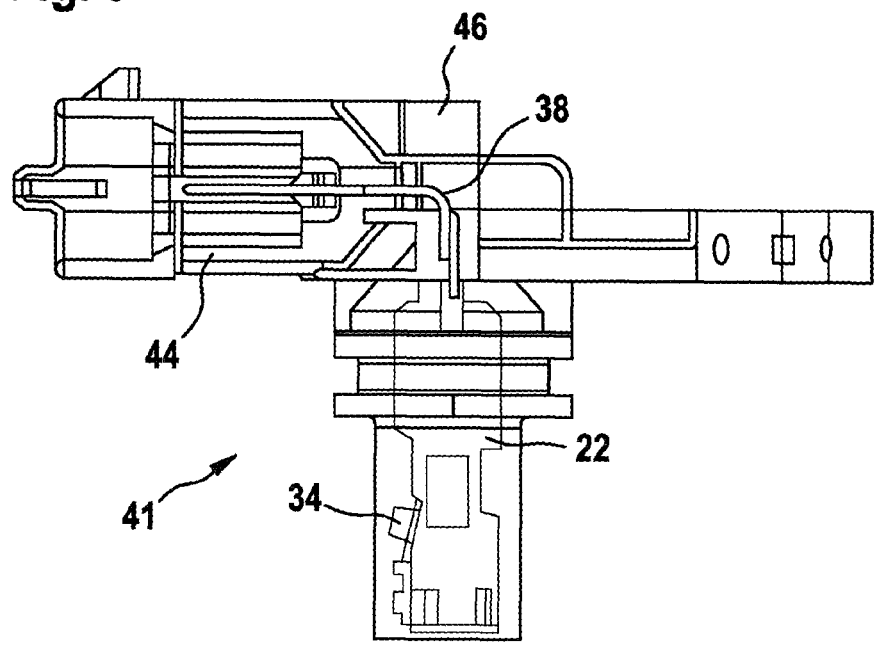
Figure 4:
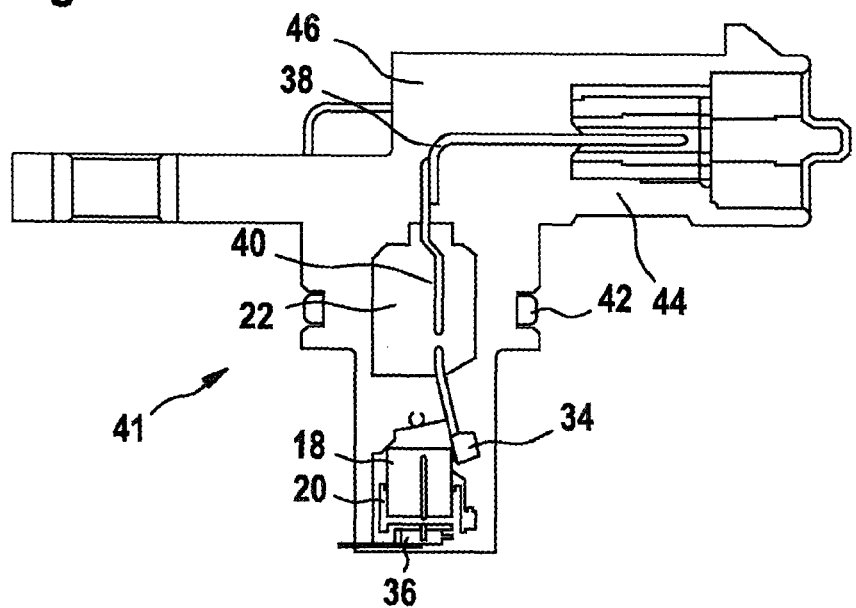

FIG. 1 shows a perspective view of the components of the base module and its placement in the base module, FIG. 2 shows further components to be installed on the base module, FIG. 3 shows a cross-section through the housing of the motion sensor that contains the base module, FIG. 4 shows a cross-section through the motion sensor and the base module, FIG. 5 shows two exemplary embodiments of different housing configurations of the motion sensor.

Three busbars 11 are formed out of one punched grid 10, two of which extend parallel to each other in the longitudinal direction. As a result of the S-shape of these two busbars 11, they are offset transversely. Third busbar 11 is bridged by a resistor 12, which crosses over the two busbars 11 that extend parallel with each other. Resistor 12 is connected via wires 14 with punched grid 10 in the manner described. Wire 14 is provided with a bend 16 on one side of resistor 12. The bend angle is greater than 90°, and is preferably 180°. A base module 22 of a motion sensor 41 is formed of punched grid 10 with resistor 12 mounted directly thereon, and with magnet 18 and a cap 20, which is at least partially enclosed in an essentially cylindrical sheath 24. Magnet 18 is enclosed by a cap 20 and is located at one end of base module 22, while the ends of the three busbars 11 extend out of the other end of base module 22 and, in one application, are not enclosed by sheath 24.

As shown in FIG. 2, the essentially cylindrical sheath 24 of base module 22 includes a wedge-shaped recess 26 that extends in the axial direction, so that the other ends of the three busbars 11 are contactable with integrated circuit 36 from the outside. A radially oriented recess 30 that is surrounded by an essentially U-shaped edge is provided at the top end of base module 22. Recess 26 and recess 30 serve to mechanically accommodate—in a space-saving manner—integrated circuit 36 and capacitors 34, which are installed on lead strips 32 and/or lead frames. The three lead strips 32, which serve to connect integrated circuit 36 and capacitors 34, are bent twice: When they exit integrated circuit 36, they extend—bent by approximately 90°—to shortly before capacitor 34, where they bend again, by a few degrees. A busbar configuration 38 is also provided that is composed of three busbars, which are not drawn individually. The distances between the three busbars increase due to an S-shaped stage of the other two outer busbars. Busbar configuration 38 also has a 90° bend. The end with the narrowest separations between the busbars in busbar configuration 38 is contacted with the end of busbars 11 of punched grid 10, which extends out of sheath 24. In the installed state, integrated circuit 36 is located in recess 30, while capacitors 34 and the end of lead strips 32 are accommodated in recess 26. Lead strips 32 are in electrical contact with the ends of busbars 11 of punched grid 10, which extend out of recess 26.

According to FIG. 3, base module 22—equipped with integrated circuit 36, capacitors 34, lead strips 32, and busbar configuration 38—is enclosed in a housing 46, which transitions into a plug 44, via which the busbars of busbar configuration 38 are electrically accessible. The entire configuration that results is referred to as a motion sensor 41.

FIG. 4 shows a cross-section of motion sensor 41 and the placement of the components, which are labeled with the same reference numerals as in the previous figures. An O-ring 42 is located in a circumferential groove in housing 46.

Two possible designs of housing 42 of motion sensor 41 are shown in FIG. 5. The design shown on the left corresponds with that shown in FIGS. 3 and 4, while plug 44 in the design shown on the right is oriented in the axial direction of base module 22. Busbar configuration 38 therefore does not have a 900 bend in this case.

Base module 22 is part of a motion sensor 41, which detects motions based on a change in a magnetic field. Integrated circuit 36, which senses the change in the magnetic field, is equipped, for example and in a known manner, with at least one Hall element, as an example of a sensor that is sensitive to a magnetic field, and which reacts to magnetic field of magnet 18—which may be altered using external ferromagnetic components—by outputting a changeable Hall voltage. In one possible application of motion sensor 41 as a speed sensor for sensing the wheel speed of a motor vehicle, the sensing end of motion sensor 41 is adjacent to a ferromagnetic component, which is designed as a toothed ring and rotates with the wheel of the motor vehicle. The magnetic field of magnet 18, which changes with the transition between teeth and tooth gaps, determines the output voltage of motion sensor 41. Magnet 18 is part of the measurement value sensor device. It may also be excited by an external magnetic trigger wheel or the like, however. In this case, magnet 18—as part of the measurement value sensor device—would then be eliminated.

Base module 22 is composed of punched grid 10 (e.g., CuSn), onto which resistor 12—as an example of a wiring means—is welded. Resistor 12 is part of an EMC network for reducing external electromagnetic disturbing influences. Resistor 12 also serves to adjust the particular supply voltage. With a 12V supply voltage, a 200 Ohm-resistor 12 is used, for instance. With a supply voltage of 5V, a 52 Ohm-resistor is used. Different base modules 22 therefore exist for different supply voltage levels. Resistor 12 will be enclosed in a sheath 24, and it is preferably provided with a coating made of a polyamide material. To increase the robustness against great, frequent temperature changes in particular, wires 14 that contact resistor 12 are made of steel. Wire 14 is also bent in a particular shape. The radius of bend 16 of wire 14 is preferably greater than 2 mm, and the bend angle is preferably greater than 90°. Resistor 12 is welded directly to punched grid 10 and—together with magnet 18 and cap 20—is provided with a coating—e.g., of a polyamide material—applied via injection-moulding in just one working step. Resistor 12 fulfills yet another function, i.e., to cross busbars 11, to satisfy a customer's desire for a certain plug configuration. For example, the ground connection of integrated circuit 36 is in the center, but the user would like to have the ground pin of plug 44 on the side. The special S shape of the two busbars 11 of punched grid 10 is provided for this purpose; it results in the necessary transverse shift of center busbar 11 to the outer position, or the necessary transverse shift of the outer busbar to the center position. Resistor 12 now serves to cross the two S-shaped busbars 11, in order to bring the right connection of integrated circuit 36 in electrical contact with left busbar 11, which is now exposed due to the transverse shift.

Base module 22 may now be adapted to a customer's particular requirements. This takes place by selecting a function-specific integrated circuit 36 that is designed for the particular application (e.g., speed sensor, phase sensor, transmission sensor for a digital tachograph, module applications in a cylinder head cover in a motor vehicle, etc.) of motion sensor 41. Different installation sites of motion sensor 41 may also be accommodated using different shapes of housing 46, as shown in FIG. 5 as an example. In addition, the customer may select a desired busbar configuration 38, with which the plug design and housing geometry may be varied.

The mechanical design of integrated circuit 36, lead strips 32 (lead frames) and capacitors 34 is retained, however, so that integrated circuit 36 may be placed in recess 26, and so that capacitors 34 and the ends of lead frames 32 may be placed in recess 30. By bending lead frame 32 twice, as described initially, a particularly small base module 22 with a small diameter may be attained. Capacitors 34 installed on lead frame 32 of integrated circuit 36 therefore take up little installation space overall. The connections of integrated circuit 36 are bridged by capacitors 38, which keep any high-frequency disturbances that penetrate the connection cable away from integrated circuit 36.

Once function-specific integrated circuit 36 has been contacted electrically with busbars 11 via capacitors 34 and lead strips 32, base module 22 is provided with customer-specific busbar configuration 38. Finally, the base module, integrated circuit 34 (at least partially), capacitors 34, lead strips 32, and busbar configuration (38) (at least partially) are provided with a coating of Thermoplast applied in one step via injection-moulding, thereby forming housing 46 with plug 44 of motion sensor 41.

What is claimed is:

1. A base module for a motor vehicle motion sensor, wherein the motion sensor is selected from the group consisting of a speed sensor, a phase sensor, and a transmission sensor; the base module including at least one busbar for contacting an integrated circuit used to sense a motion, wherein the base module also includes at least one means for wiring, which are located on the busbar and include a wire, the busbar and the means for wiring being enclosed at least partially by a sheath, and wherein the wire is provided with a bend that is greater than 90 degrees and composed of steel, wherein the integrated circuit is located on a lead strip, which is bent at least twice.

2. The base module for a motion sensor as recited in claim 1, wherein the at least two busbars are part of a punched grid, and the means for wiring are installed directly on the punched grid.

3. The base module for a motion sensor as recited in claim 1, wherein at least three busbars are located in the base module, with the busbars being crossed by the means for wiring.

4. A base module for a motor vehicle motion sensor, wherein the motion sensor is selected from the group consisting of a speed sensor, a phase sensor, and a transmission sensor; the base module including at least one busbar for contacting an integrated circuit used to sense a motion, wherein the base module also includes at least one means for wiring, which are located on the busbar and include a wire, the busbar and the means for wiring being enclosed at least partially by a sheath, and wherein the wire is provided with a bend that is greater than 90 degrees and composed of steel, wherein at least one magnet is at least partially enclosed by the sheath in the base module.

5. The base module for a motion sensor as recited in claim 1, wherein the sheath includes at least one recess for contacting the at least two busbars.

6. The base module for a motion sensor as recited in claim 1, wherein the sheath includes at least one recess for mechanically accommodating the integrated circuit.

7. The base module for a motion sensor as recited in claim 1, wherein the base module is enclosed at least partially by a housing.

8. The base module for a motion sensor as recited in claim 1, wherein at least one additional busbars that is contactable with the at least two original busbars is located in the housing.

9. The base module for a motion sensor as recited in claim 7, wherein the housing includes at least one plug.

10. The base module for a motion sensor as recited in claim 1, wherein at least one cap is at least partially enclosed by the sheath in the base module.

11. The base module for a motion sensor selected from the group consisting of a speed sensor, a phase sensor, and a transmission sensor, the base module comprising a punched grid including a plurality of busbars contacting an integrated circuit sensing a motion; at least one means for wiring installed directly on said punched grid and crossing at least some of said busbars, said wiring means including a wire provided with a bend that is greater than 90° and composed of steel; and a sheath at least partially enclosing said busbars and said means for wiring.

12. The base module for a motion sensor as recited in claim 11, further comprising a resistor connected via said means for wiring with said punched grid so that said bend is provided on one side of said resistor.

\* \* \* \* \*